US006223519B1

(12) United States Patent
Basu et al.

(10) Patent No.: US 6,223,519 B1
(45) Date of Patent: May 1, 2001

(54) METHOD OF GENERATING POWER USING AN ADVANCED THERMAL RECUPERATION CYCLE

(75) Inventors: Arunabha Basu, Naperville, IL (US); Shankar Rajagopal, Houston, TX (US)

(73) Assignee: BP Amoco Corporation, Chicago, IL (US)

( * ) Notice: Subject to any disclaimer, the term of this patent is extended or adjusted under 35 U.S.C. 154(b) by 0 days.

(21) Appl. No.: 09/248,437

(22) Filed: Feb. 11, 1999

(51) Int. Cl.[7] .................................................. F02B 43/12
(52) U.S. Cl. ........................................ 60/39.02; 60/34.12
(58) Field of Search ................................. 60/30.02, 39.05, 60/39.12

(56) References Cited

U.S. PATENT DOCUMENTS

| 4,185,456 |   | 1/1980 | Cummings ........................... 60/39.02 |
| 4,820,594 | * | 4/1989 | Sugita et al. ........................... 429/17 |
| 4,900,333 |   | 2/1990 | Bos ..................................... 48/197 R |
| 5,048,284 | * | 9/1991 | Lywood et al. ..................... 60/39.02 |
| 5,394,685 | * | 3/1995 | Kesten et al. ....................... 60/39.02 |
| 5,431,007 | * | 7/1995 | Viscovich et al. ................... 60/39.05 |
| 5,513,488 |   | 5/1996 | Fan ...................................... 60/39.05 |
| 5,595,059 |   | 1/1997 | Huber et al. ........................ 60/39.02 |
| 5,664,414 |   | 9/1997 | Bronicki et al. .................. 60/39.182 |
| 5,669,216 |   | 9/1997 | Ankersmit et al. ................. 60/39.02 |
| 5,678,408 | * | 10/1997 | Janes ....................................... 60/728 |
| 5,896,738 | * | 4/1999 | Yang et al. ........................... 60/39.05 |
| 6,059,995 | * | 5/2000 | Topsoe et al. ........................ 252/373 |

FOREIGN PATENT DOCUMENTS

| 761942 A1  | 3/1997  | (EP) . |
| 2311824    | 10/1997 | (GB) . |
| 63-280825  | 11/1988 | (JP) . |
| 4-347308   | 2/1992  | (JP) . |
| 7-317505   | 12/1995 | (JP) . |

OTHER PUBLICATIONS

Kesser, K.F. et al. "Analysis of a Basic Chemically Recuperated Gas Turbine Power Plant," *Journal of Engineering for Gas Turbines and Power*, vol. 116 (Apr. 1994), pp. 277–284.

Adelman, S.T. et al. "A Methane–Steam Reformer for a Basic Chemically Recuperated Gas Tubine," *Journal of Engineering for Gas Turbines and Power*, vol. 117 (Jan. 1995), pp. 16–23.

(List continued on next page.)

*Primary Examiner*—Timothy S. Thorpe
*Assistant Examiner*—David J. Tonrente
(74) *Attorney, Agent, or Firm*—Thomas A. Yassen (57) ABSTRACT

A power generating method that includes the steps of burning a reformed fuel in the presence of air in a combustor of a gas turbine to generate a hot exhaust gas is disclosed. The hot exhaust gas is then passed through a turbine section of the gas turbine to generate power and, thereafter, the hot exhaust gas is passed through a heat recovery system where the hot exhaust gas is successively cooled as it passes through a series of heat exchangers. Heat exchangers comprising the heat recovery system include combustion air pre-heater(s); a thermochemical recuperator (or reformer), wherein hot exhaust gas provides the endothermic heat of reaction necessary to reform a raw fuel/steam mixture to the combustible, reformed fuel that is eventually burned in the combustor; and one or more water/steam heaters which supply steam to a low-pressure, condensing steam turbine of a bottoming Rankine cycle to generate additional power. A cooled exhaust gas exits the heat recovery system and, optionally, may be sent to scrubbers and/or other unit operations for further processing, such as removal of harmful toxins, before being vented to the atmosphere.

22 Claims, 2 Drawing Sheets

OTHER PUBLICATIONS

Harvey, S.P. et al. "Reduction of Combustion Irreversibility in a Gas Turbine Power Plant Through Off–Gas Recycling," *Journal of Engineering for Gas Turbines and Power*, vol. 117 (Jan. 1995), pp. 24–30.

Collins, S. "Power Generation," in: *Encyclopedia of Chemical Technology* (1996), vol. 20, pp. 1–40. Ref. TP9.E685.

Rostrup–Nielsen, J.R. et al. "The Role of Catalysis in the Conversion of Natural Gas for Power Generation," *Stud. Surf. Sci. Catal.*, vol. 107 (1997), pp. 473–488.

Wilson, D.G. et al. *The Design of High–Efficiency Turbomachinery and Gas Turbines*, 2d ed. (1998), pp. 29–37.

* cited by examiner

METHOD OF GENERATING POWER USING AN ADVANCED THERMAL RECUPERATION CYCLE

BACKGROUND OF THE INVENTION

1. Field of the Invention

The invention relates generally to a method of generating electrical power using an advanced thermochemical recuperation cycle and, more specifically, to a method of increasing the ratio of power generated by a gas turbine to that generated by a steam turbine, and to improving the net power generation efficiency relative to a conventional combined-cycle power plant.

2. Brief Description of Related Technology

The combustion of gaseous fuels is a key characteristic of most modern electrical power generation processes. Overall performance of each process is often measured by the efficiency at which energy may be collected from a given amount of fuel burned in the process. Sensible heat present in the combustion exhaust gas is used to generate pressurized steam to drive one or more rotating turbines coupled to electric generators to produce electricity. The thermodynamic cycle in which water is converted to pressurized steam in a water boiler, the pressurized steam is passed through a turbine having rotating blades where the steam expands, and thereafter is condensed before being pumped back to the water boiler, is known as the Rankine cycle. Because of its relative simplicity and reliability, power plants using one or more Rankine cycles have dominated the electrical power generating industry. Numerous modifications have been attempted to optimize the efficiency of Rankine cycles such as, for example, the use of high-pressure, intermediate-pressure, and low-pressure turbines, which together permits more efficient power generation as high-pressure steam is expanded in a stage-wise manner. See generally, Collins, S. "Power Generation." in: *Encyclopedia of Chemical Technology* (1996 ed.), vol. 20, pp. 1–40. Ref. TP9.E685.

In a conventional simple-cycle power plant, compressed air and a fuel are fed to a gas-fired combustor where the fuel is burned in the presence of oxygen-containing gas (usually air) to produce a hot exhaust gas. The hot exhaust gas is then fed to one or more gas turbines coupled to electric generators where the gas expands (and cools), thereby causing turbine blades to rotate, producing mechanical energy which is converted to electricity in the generators. The expanded exhaust gas having passed through the turbines may, optionally, undergo various unit operations where toxins and other pollutants may be removed. The cooled exhaust gas eventually is vented to the atmosphere. Modern simple-cycle power plants are able to obtain an overall energy efficiency of about 35% to about 38% (calculated as the energy equivalent electricity produced relative to the lower heating value (LHV) of the fuel fed to the combustor, referred to hereinafter as the "LHV basis").

Combined-cycle power plants improve on the efficiency of the simple-cycle power plant by using the sensible heat remaining in the hot exhaust gas of a simple-cycle power plant to drive another power cycle, typically the Rankine cycle—hence the name "combined-cycle power plant." Modern combined-cycle power plants typically are capable of an overall energy efficiency of about 45% to about 55% (LHV basis). Thus, use of a Rankine cycle in combination with a simple-cycle plant results in approximately a 10% to a 17 point increase in efficiency over the simple-cycle plant alone. In fact, bottoming steam cycles can account for about 30% to about 40% of the overall power output of a combined-cycle power plant.

For a number of reasons, however, it is not desirable to have a bottoming steam cycle that generates a large share of the total power. One reason is that steam cycles are very difficult to control precisely. Power generated by steam cycles is controlled ultimately by the amount of gaseous fuel burned in the combustors and the amount of heat remaining in the hot turbine exhaust gas. When it is desired to increase power generation (e.g., during peak load periods) or decrease power generation (e.g., during partial load periods) to match power consumption demands, the most practical way to change the power output is to increase or reduce the flow of gaseous fuel fed to the combustors. In so doing, the amount of power generated by both of the gas turbines and the steam turbines would be affected. Since each of the gas turbines and the steam turbines produce large shares of the total power generated by the plant, careful selection of gaseous fuel flowrates must be made. This proves to be difficult to accomplish even with the advent of complex process control computers. The difficulty is exacerbated by the use of multi-pressure steam turbines in the bottoming steam cycle. Hence, switching between partial and peak load operation of conventional combined-cycle power plants poses many problems not effectively addressed by the prior art.

Additionally, steam turbines generally are less efficient than gas turbines and are more costly to design and operate, as are the corresponding heat exchange equipment. Therefore, it would be desirable to generate a higher percentage of the overall power using the upstream gas turbines, and a lower percentage of the power in the steam turbines. Despite advances in the machinery (e.g., turbines, compressors, combustors, etc.), there are limits on the power generation efficiency of conventional combined-cycle power plants.

Prior art attempts to increase the power generation efficiency of the gas turbines include the use of thermochemical recuperation (hereinafter "TCR") cycles. One particular type of TCR cycle employs sensible heat in the hot exhaust gas of a gas turbine to supply the heat necessary for endothermic catalytic conversion of hydrocarbons (e.g., natural gas or derivatives thereof) into a desirable combustible fuel which then may be combined with compressed air and burned in the combustors upstream of the gas turbines. More specifically, in this TCR cycle, heat is transferred in a chemical reactor (recuperator) from the exhaust gas of a gas turbine to a reacting natural gas/steam mixture which is passed over a steam-reforming catalyst (e.g., a nickel-based catalyst) at high temperatures and is converted to a desirable combustible mixture of hydrogen and carbon monoxide. In such a recuperator, heat is absorbed by the combustible mixture and is released in the subsequent combustion of the mixture in the combustor. An example of this type of TCR cycle is disclosed in EP 761,942 (hereinafter "EP '942") and has a stated overall energy efficiency of about 48% (LHV basis), which, according to EP '942 is about "20% higher than what is otherwise obtained in a conventional simple-cycle plant." (See column 3, lines 48–51 of EP '942.)

In a conceptually different TCR cycle, such as the one disclosed in Harvey, S.P., et al., *Reduction of Combustion Irreversibility in a Gas Turbine Power Plant Through Off-Gas Recycling, Journal of Engineering for Gas Turbines and Power*, Vol. 117, no. 1 (Jan. 1995), pp. 24–30 (hereinafter the "Harvey et al. publication"), the exhaust gas of a gas turbine is used to directly and indirectly heat a mixture of raw fuel, water, and a part of a recycled exhaust gas (following cooling and water condensation), into a reformed fuel fed to the combustor. More particularly, the heat recovered from the turbine exhaust gas is used to drive an endothermic reforming reaction in which the raw fuel is heated and partially oxidized in a thermochemical recuperator with oxygen-containing constituents (i.e., carbon dioxide and water) present in the recycled exhaust gas. The reformed fuel and most of the recycled exhaust gas (comprising nitrogen, carbon dioxide, and other inert gas) are then burned stage-wise in the presence of air in three combustors, each of which is associated with a gas turbine. An exhaust gas exits the combustors and is passed through the turbines, followed by partial combustion with added air to result in a purported power generation efficiency of up to 65.4% (LHV basis).

There are several problems associated with the particular TCR cycle described in the foregoing paragraph and the publication cited therein. First, a significant amount of environmentally harmful nitrogen oxides (generally designated "$NO_x$") are undesirably formed during the combustion of the reformed fuel and can undesirably accumulate in the recycled exhaust gas/water streams. The accumulation of $NO_x$ can cause severe corrosion problems in recycle gas compressors and related process equipment.

Second, temperatures of about 1382° F. (about 750° C.) to about 1700° F. (about 927° C.) are required to appreciably reform a natural gas (containing mostly methane gas) with recycled steam and carbon dioxide. For a TCR application using turbine exhaust gas as the heat source for the endothermic reforming reaction, this would require significantly high turbine exhaust gas temperatures. According to FIG. 1 of the Harvey et al. publication, such high temperatures are ensured because the combustion exhaust gas exits the combustor and enters the three-stage gas turbine at a temperature of 2300° F. (about 1260° C.) and, thereafter, passes through and exits the third-stage gas turbines at a temperature of 1821 ° F. (about 994° C.). It is known that conventional gas turbines are designed to operate efficiently within a temperature range of about 1050° F. (about 565° C.) to about 1150° F. (about 620° C.). The lower exhaust gas temperatures enable conventional turbines to extract more work, i.e., generate more electrical power, per turbine. Because the temperature of the exhaust gas according to the design disclosed in the Harvey et al. publication is so high, it teaches the use of staged gas turbines to achieve a similar work load. The Harvey et al. publication at page 26, discloses state-of-the-art turbines, such as high-temperature metal turbines employing circulating cooling air and other alternatives for high-temperature gas turbine operation. These alternative turbines, however, are very expensive. Additionally, the use of staged expansion requires the use of multiple turbines in series, which is expensive.

Generally, it is known that TCR cycles can be used to boost power generating efficiency of simple-cycle power plants. There is no teaching in the prior art of using a bottoming Rankine cycle in combination with a TCR cycle. However, even if the success of Rankine cycles in combined-cycle power plants would lead one of ordinary skill in the art to conclude that such a bottoming Rankine cycle could be useful in combination with a TCR cycle, the problems associated with the use of steam turbines in the Rankine cycle and the fact that the Rankine cycle will generate too high a share of the overall power generated by the power plant are problems not resolved by the previously known systems. Furthermore, one of ordinary skill in the art would not conclude that such TCR cycles, in combination with a bottoming Rankine cycle could match or improve on the power generating efficiency of conventional combined-cycle power plants.

The overall efficiency of a power plant is a function of the efficiency of the gas turbine(s). Gas turbine efficiency, in turn, is a function of combustor air and fuel inlet temperatures, turbine inlet temperature, and upstream compressor efficiencies, to name a few. Certain of these factors are determined by the process equipment and/or the type of power cycle(s) employed, while other factors are not readily controllable. Overall efficiency, however, is but one characteristic of a power plant design. The ability to safely and easily accommodate peak and partial load power demands is another characteristic of the design. Heretofore, there has not been a suitable design which improved on both of these characteristics, especially the characteristic of peak and partial load operation, thereby providing the ability to safely and easily accommodate power plant operation during periods of partial and peak load demands.

SUMMARY OF THE INVENTION

Accordingly, the invention provides a method of generating power that includes the steps of burning a reformed fuel in the presence of compressed air in a combustor to generate a hot exhaust gas. The hot exhaust gas is then passed through a gas turbine to generate power and, thereafter, the exhaust gas is successively cooled in a series of heat exchangers. One such heat exchanger is a catalytic reactor (thermochemical recuperator or reformer) wherein the exhaust gas provides the endothermic heat of reaction necessary to reform a mixture of steam and a raw, natural gas-derived, oxygenated fuel capable of being reformed at a temperature of about 300° F. to about 932° F., to produce the combustible, reformed fuel that is eventually burned in the combustor. The reactor brings into indirect heat exchange contact (relationship) the hot exhaust gas and the raw fuel/steam mixture. Sensible heat remaining in the hot exhaust gas exiting the catalytic reactor can be used to heat water and steam which is subsequently expanded in a low-pressure condensing steam turbine of a bottoming steam or Rankine cycle to generate additional power. The raw, natural gas-derived, oxygenated fuel used in the invention preferably is selected from the group consisting of methanol, ethanol, dimethyl ether, dimethyl carbonate, and mixtures thereof.

Advantages of the invention may become apparent to those skilled in the art from a review of the following detailed description, taken in conjunction with the drawings, the examples, and the appended claims.

BRIEF DESCRIPTION OF THE DRAWINGS

For a complete understanding of the process and apparatus of the invention reference should be made to the following detailed description and accompanying drawings wherein.

While the invention is susceptible of embodiment in various forms, there is illustrated in the drawing figures and will hereafter be described specific embodiments of the invention, with the understanding that the disclosure is intended to be illustrative, and is not intended to limit the invention to the specific embodiments described and illustrated herein.

DETAILED DESCRIPTION OF THE INVENTION

According to the invention, power is generated by a method that includes the steps of burning a reformed fuel in the presence of compressed air in a combustor of a gas turbine to generate an exhaust gas at an elevated temperature with respect to ambient. The reformed fuel preferably is a mixture of hydrogen, carbon monoxide, and small amounts of carbon dioxide. The exhaust gas is then passed through a gas turbine section to generate power and, thereafter, the exhaust gas is passed from an outlet of the gas turbine to a series of heat exchangers within a heat recovery system where the exhaust gas is successively cooled as it passes through each heat exchanger. One such heat exchanger is an air pre-heater which is used to pre-heat compressed air prior to its introduction into the combustor of the gas turbine. Another such heat exchanger is a thermochemical recuperator (or fuel reformer), wherein the exhaust gas provides the endothermic heat of reaction necessary to reform the raw fuel to the combustible, reformed fuel that is eventually burned in the combustor. Sensible heat remaining in the exhaust gas downstream of the fuel reformer can be used to generate steam from recirculating water. The generated steam is passed through a condensing steam turbine, preferably a low-pressure condensing steam turbine, of a bottoming steam or Rankine cycle to generate additional power. A cooler exhaust gas exits the heat recovery system and, optionally, may be sent to scrubbers and/or other unit operations for further processing, such as removal of harmful toxins such as $NO_x$, before being vented to the atmosphere.

An advanced thermochemical recuperation combined-cycle power plant according to the invention generally includes a combustion system, a heat recovery system, and a bottoming Rankine cycle. More specifically, the combustion system includes a gas turbine, and the heat recovery system includes one or more air heaters to pre-heat combustion air, one or more fuel heaters to pre-heat the reformed fuel feed, a fuel reformer to convert the raw fuel and steam into the reformed fuel for combustion, one or more high-pressure water heaters to vaporize the raw fuel prior to its entry into the fuel reformer, and one or more steam boilers to produce pressurized steam for combination with the raw fuel and for use as a recirculating fluid in the bottoming Rankine cycle. The bottoming Rankine cycle includes a recirculating pressurized steam loop that feeds a condensing steam turbine, preferably a low-pressure condensing steam turbine, to generate additional mechanical power.

Figure 1:
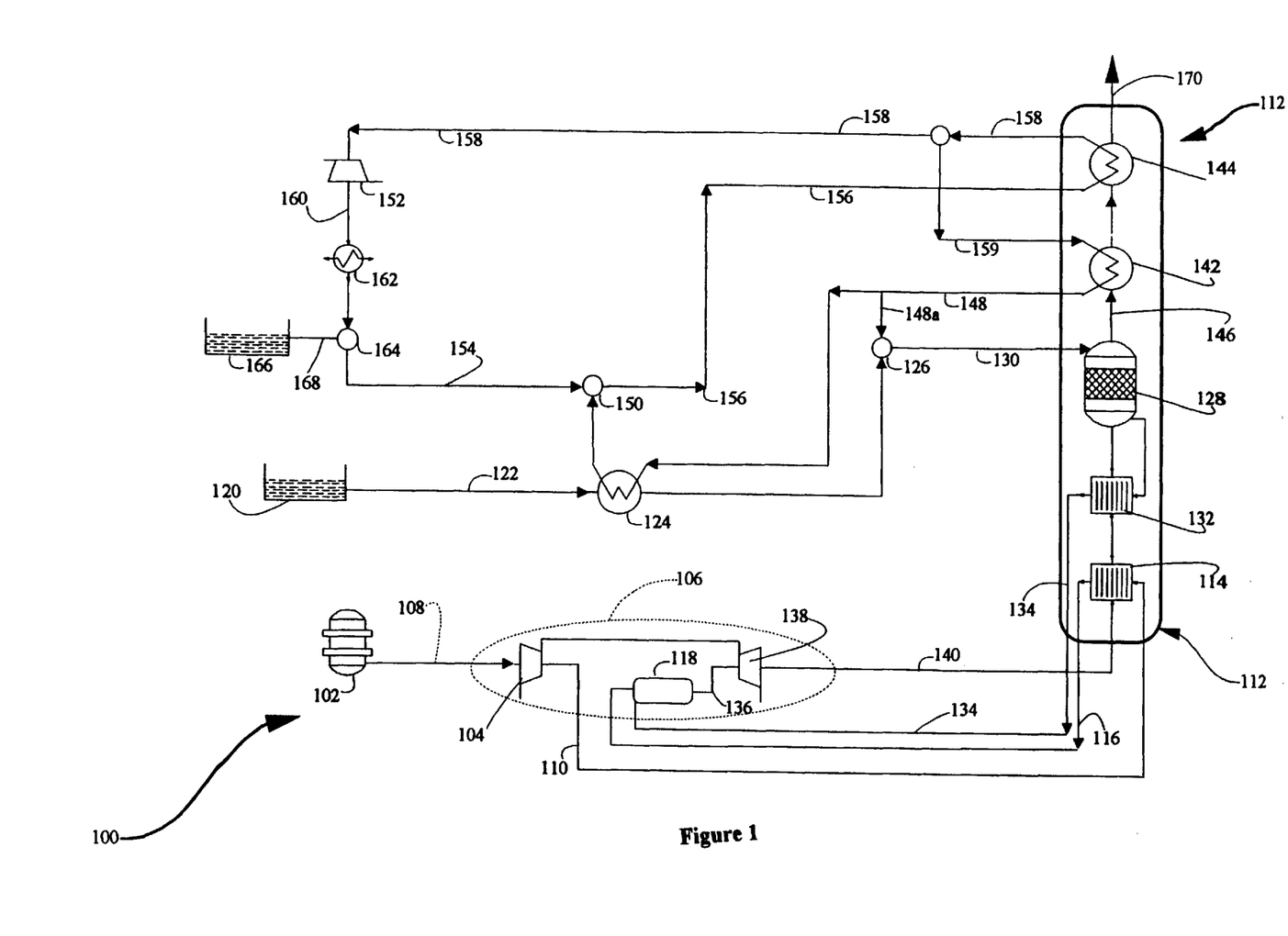
FIG. 1 is a process flow diagram illustrating one embodiment of an advanced thermochemical recuperation combined-cycle power plant according to the invention; and, FIG. 2 is a process flow diagram illustrating another embodiment of an advanced thermochemical recuperation combined-cycle power plant according to the invention, wherein a selected portion of the combustion air is compressed separately (outside the gas turbine) in a stage-wise manner using intercooling and is subsequently heated prior to introduction into the combustor of a gas turbine.

Referring now to the drawing figures, wherein like reference numbers represent identical elements or features in the various figures, FIG. 1 illustrates a process flow diagram of an advanced thermochemical recuperation combined-cycle power plant, generally designated 100, according to the invention. Air from an air source 102 is fed to an air compressor 104 of a gas turbine 106 through an air feed line 108. Compressed air exits the compressor 104 through a compressed air line 110 and is heated in a heat recovery system (HRS), generally designated 112, more specifically, in an air pre-heater 114 of the heat recovery system 112. A hot exhaust gas is used as the heat transfer fluid to indirectly heat the compressed air in the air-preheater. A heated compressed air exits the air pre-heater 114 through a conduit 116 and is passed into a combustor 118 of the gas turbine 106 where a reformed fuel is burned to produce the hot exhaust gas. By "hot" it is meant that the exhaust gas produced by the combustion is at an elevated temperature with respect to ambient, more specifically, at a temperature in a range of about 700° F. (about 370° C.) to about 3000° F. (about 1650° C.), more preferably about 1800° F. to about 3000° F. (about 1650° C.).

Raw liquid fuel from a fuel source 120 is pressurized by using a pump (not shown) and introduced to the advanced thermochemical recuperation combined-cycle power plant 100 through a fuel line 122. The raw fuel is heated and/or vaporized in a heat exchanger 124 using pressurized water as a heat transfer fluid, and is subsequently combined at a mixing point 126 with pressurized steam. Raw liquid fuels for use in the invention include natural gas-derived, oxygenated fuels that can be reformed at low temperatures in a range of about 300° F. (about 149° C.) to about 932° F. (about 500° C.), and preferably about 300° F. (about 149° C.) to about 670° F. (about 354° C.). Such fuels include methanol, ethanol, dimethyl ether, dimethyl carbonate, methyl formate, and mixtures thereof. Suitable fuels for use in the invention also include those fuels that have reforming characteristics similar to that of dimethyl ether when reformed in the presence of steam and a reforming catalyst. Such characteristics include, but are not limited to the conversion, reformation temperature and pressure requirements, and steam:fuel molar ratio requirements. A preferred fuel for use in the invention is dimethyl ether. The pressurized water used to heat and vaporize a raw dimethyl ether fuel, for example, as well as the steam used to reform the vaporized dimethyl ether fuel have a pressure of about 20 bars absolute to about 40 bars absolute, preferably about 22 bars absolute to about 24 bars absolute.

The raw fuel and pressurized steam mixture (hereafter the "fuel/steam mixture") is passed into a fuel reformer 128 of the heat recovery system 112 through a fuel/steam mixture line 130, where the fuel/steam mixture is catalytically converted to a reformed fuel suitable for combustion in the downstream combustor 118 of the gas turbine 106. Optionally, the reformed fuel may be heated in a fuel heater 132 disposed downstream of the reformer 128 (with respect to the direction of flow of the fuel/steam mixture) in the heat recovery system 112. The pressure level of the liquid fuel is adjusted such that the reformed fuel gas exiting the fuel reformer 128 is at the pressure required at the inlet of the combustor 118. Hot exhaust gas exiting the air pre-heater 114 provides the heat necessary to catalytically reform the raw fuel. The raw fuel/steam mixture is passed over a steam reforming catalyst and, with the heat transferred from the hot exhaust gas, is converted to a suitable combustible fuel mixture containing various mixtures of hydrogen, carbon monoxide, and carbon dioxide depending on, among other variables, the particular fuel, reformer operating conditions, and the molar ratio of steam to raw fuel. A suitable steam-reforming catalyst for use in the invention includes a conventional nickel-based catalyst used to make hydrogen from natural gas.

The reformed fuel exits the fuel reformer 128 (and, optionally, the fuel heater 132) of the heat recovery system 112 through a fuel feed line 134 and is injected into the combustor 118, where it is burned in the presence of compressed air to produce a hot exhaust gas. The hot exhaust gas immediately exits the combustor 118 through an exhaust line 136 and is passed through a turbine section 138 of the gas turbine 106 where the exhaust gas partially cools and expands thereby generating mechanical power. The expanded and partially cooled exhaust gas exits the gas turbine 138 through a hot exhaust gas line 140. Sensible heat remaining in the exhaust gas exiting the gas turbine 138 is used in various heat exchangers of the heat recovery system 112. As noted above, one such heat exchanger includes the air pre-heater 114 which is used to pre-heat compressed combustion air. Other previously described heat exchangers include the raw fuel reformer 128 which is used to reform the fuevsteam mixture and the optional fuel heater 132 which may be used to heat the reformed fuel.

Sensible heat remaining in the exhaust gas exiting the fuel reformer 128 is used in a series of low-pressure and intermediate-pressure water heaters (evaporators) 142 and 144, respectively, of the heat recovery system 112. These heat exchangers 142 and 144 are an integral part of two conventional heat recovery steam generator loops, which each include steam drums, dearators, boiler feed water supply pumps and economizers, water treatment devices, and superheaters, none of which are shown in the drawing figures. Exhaust gas exits the fuel reformer 128 through an exhaust gas line 146 and is passed as a heat transfer fluid to the intermediate-pressure water heater 142 to produce hot water and intermediate-pressure steam having a pressure of about 20 bars absolute to about 40 bars absolute, preferably about 22 bars absolute to about 24 bars absolute. The intermediate-pressure steam exits the steam heater 142 and the heat recovery system 112 through a intermediate-pressure steam line 148. A portion of the intermediate-pressure steam present in the steam line 148 is siphoned in a steam line 148a and is combined with the vaporized raw fuel fed to the fuel reformer 128. The hot water present in the line 148 is passed to the raw fuel heat exchanger 124 where the hot water serves as the heat transfer fluid to supply heat necessary to vaporize the raw liquid fuel.

Downstream (with respect to the direction of flow of the intermediate-pressure steam) of the raw fuel heat exchanger 124, the now-cooled water is mixed at a mixing point 150 with condensing steam exiting a low-pressure steam turbine 152, and present in a recirculating steam line 154. The resultant mixture is passed through a line 156 and is subsequently heated in the low-pressure water heater (economizer) 144 of the heat recovery system 112. Exhaust gas exiting the intermediate-pressure steam heater 142 is used as the heat transfer fluid in the low-pressure water heater (economizer) 144. A heated low-pressure steam exits the steam heater 144 through a low-pressure steam line 158. A portion of the low-pressure steam present in the steam line 158 is siphoned in a steam line 159 and is heated in the intermediate-pressure steam heater 142 before being passed through the intermediate-pressure steam line 148. The remainder of the low-pressure steam is passed via the low-pressure steam line 158 through a low-pressure steam turbine 152 where the low-pressure steam expands and cools thereby generating mechanical power. The steam exits the turbine 152 through a line 160 and, optionally, is further cooled and condensed (at a low pressure) in a water cooler 162, before being combined at a point 164 with fresh boiler quality process water introduced into the advanced thermochemical recuperation cycle 100 from a water source 166 through a fresh water line 168. The exhaust gas used as the heat transfer fluid in the low-pressure steam heater 144 exits the heat recovery system 112 through a conduit 170.

Figure 2:
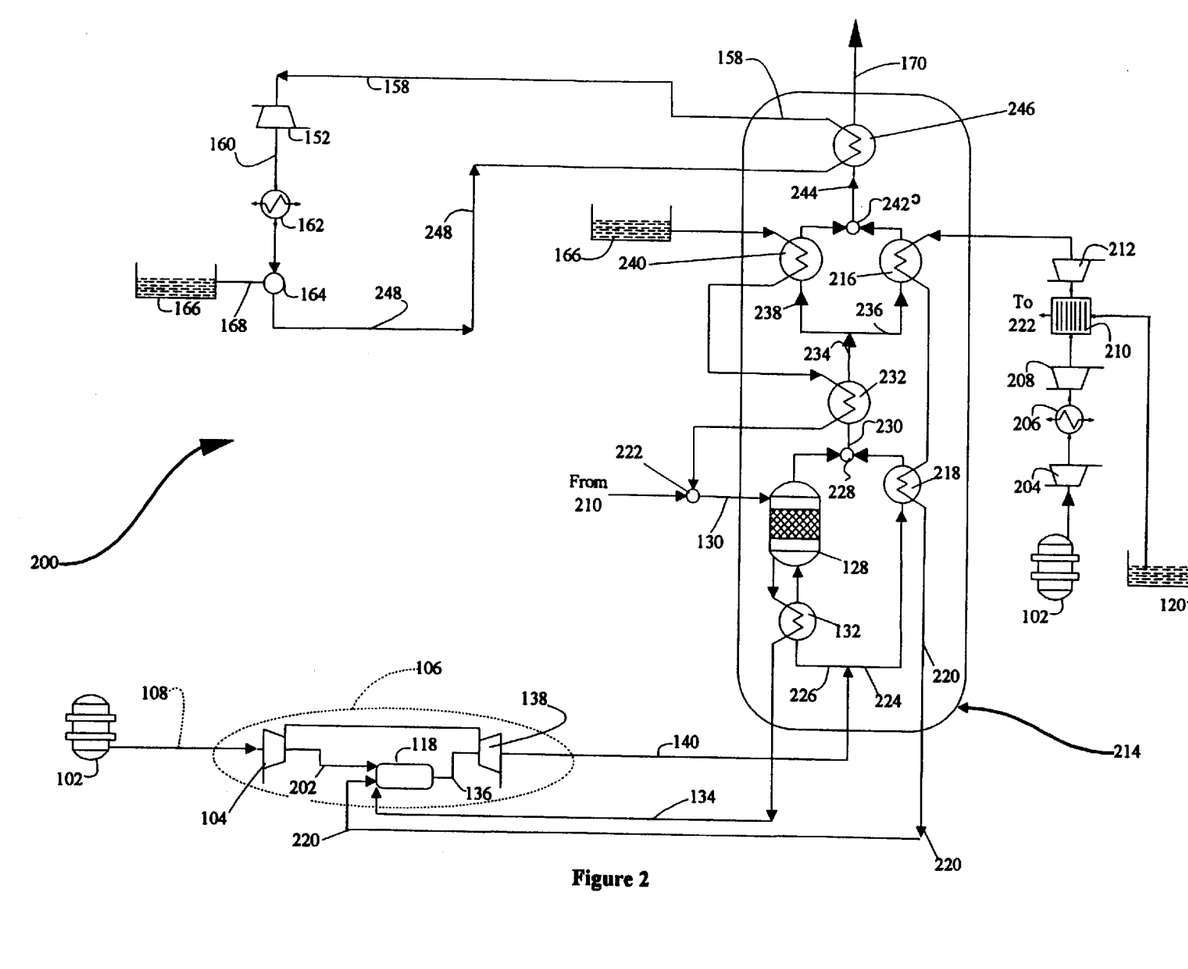

FIG. 2 illustrates a process flow diagram of an alternative embodiment of an advanced thermochemical recuperation combined-cycle power plant, generally designated 200, according to the invention. Combustion air is introduced to the power plant 200 from the air source 102. A first portion of the air from air source 102 is adiabatically compressed in a simple stage compressor 104 of the gas turbine 106, and a second portion of the air is compressed in three, inter-cooled compression stages. The first and second air portions are eventually combined and/or are introduced into the combustor 118 of the gas turbine 106. Preferably, the second air portion has a temperature of about 10° F. to about 400° F. less than that of the exhaust gas exiting the gas turbine.

The first air portion is conveyed from the air source 102 to the air compressor 104 of the gas turbine 106 through an air feed line 108. Compressed air exits the compressor 104 through a compressed air line 202 and is introduced (with the second air portion) into the combustor 118 along with the reformed fuel.

The second air portion is conveyed from the air source 102 to a first-stage compressor 204 where the air is compressed. The compressed air exits the first-stage compressor 204 and is passed to a water-cooled heat exchanger 206 before entering a second-stage compressor 208. The compressed air exits the second-stage compressor 208 and is passed to a heat exchanger 210 where the compressed air is cooled by raw liquid fuel before entering a third-stage compressor 212. The compressed air exiting the third-stage compressor is passed into a heat recovery system 214 and, more specifically, through air preheaters 216 and 218 disposed within the heat recovery system 214. Exhaust gas is used as the heat transfer fluid to indirectly heat the compressed air in the air preheaters 216 and 218. A heated compressed air exits the air preheaters 216 and 218 through a conduit 220 and is passed into the combustor 118 of the gas turbine 106 where the reformed fuel is burned to produce a hot exhaust gas. The hot exhaust gas exiting the gas turbine is passed to the heat recovery system 214 through a conduit 140.

Raw liquid fuel from the fuel source 120 is first pumped to a pressure suitable to feed a reformed fuel into the inlet of the combustor 118, and then the raw liquid fuel is vaporized in the heat exchanger 210 by compressed air exiting the second stage air compressor 208. The vaporized fuel is combined with pressurized steam at a mixing point 222 to form a fuel/steam mixture, the pressurized steam preferably having a pressure of about 16 bars absolute to about 40 bars absolute and more preferably about 22 bars absolute to about 24 bars absolute. The fuel/steam mixture is passed into the fuel reformer 128 of the heat recovery system 214 through the fuel/steam mixture line 130. Inside the reformer 128, the fuel/steam mixture is catalytically converted to a reformed fuel suitable for combustion in the downstream combustor 118 of the gas turbine 106.

Optionally, the reformed fuel may be heated in the fuel heater 132 disposed downstream of the reformer 128 (with respect to the direction of flow of the fuel/steam mixture) in the heat recovery system 214. Exhaust gas exiting the gas turbine 138 of the gas turbine 106 provides the endothermic heat necessary to catalytically reform the fuel/steam mixture in the reformer 128 and the heat necessary to heat the reformed fuel in the optional fuel heater 132. The fuel/steam mixture is passed over a steam reforming catalyst and, with the heat transferred from the exhaust gas, is converted to a suitable combustible fuel mixture containing mostly hydrogen, carbon monoxide, and trace amounts of carbon dioxide. As previously noted, a suitable reforming catalyst for use in the invention includes a conventional nickel-based catalyst commonly used to convert natural gas into hydrogen.

The turbine exhaust gas in line 140 is divided into two gas streams through lines 224 and 226. The exhaust gas in line 224 is used to preheat the second portion of compressed air exiting the air preheater 218. The exhaust gas in line 226 is used to preheat the reformed fuel in the heat exchanger 132 and reform the fuel/steam mixture in the reformer 128. The two exhaust gas streams in lines 224 and 226 are combined at a mixing point 228 and are passed through a line 230 to a water boiler/evaporator 232. The water boiler/evaporator 232 is used to generate the steam comprising the fuel/steam mixture passed into the reformer 128. The exhaust gas exits the water boiler/evaporator 232 through a line 234 and is again divided into two gas streams through lines 236 and 238. The exhaust gas in line 236 is used to preheat the second portion of compressed air exiting the air preheater 216. The exhaust gas in line 238 is used to heat water from the water source 166 in a heat exchanger 240. The hot water exiting the heat exchanger 240 is converted into steam in the water boiler/evaporator 232 and eventually combined with the raw fuel at the mixing point 222.

The exhaust gas streams exiting the preheater 216 and the heat exchanger 240 are subsequently combined at a mixing point 242 and passed in a line 244 into a low-pressure water boiler 246 to generate a low-pressure steam for the bottoming Rankine cycle. The low-pressure steam exits the water boiler 246 through the low-pressure steam line 158 and is passed through the low-pressure steam turbine 152 where the low-pressure steam expands and cools thereby generating mechanical power. The condensed steam exits the steam turbine 152 through condensed steam line 160 and, optionally, is further cooled and condensed (at a low pressure) in a water cooler 162, before being combined at a point 164 with fresh boiler quality process water introduced into the advanced thermochemical recuperation combined-cycle power plant 200 from the water source 166 through a fresh water line 168. Water exits the mixing point 164 through a water line 248 and is subsequently vaporized in the low-pressure water boiler 144. The exhaust gas used as the heat transfer fluid in the low-pressure water boiler 144 exits the heat recovery system 214 through a conduit 170.

The reformed fuel exits the fuel reformer 128 (and, optionally, the fuel heater 132) of the heat recovery system 214 through a fuel feed line 134 and is injected into the combustor 118, where it is burned in the presence of compressed air (both first and second air portions described above) to produce the exhaust gas. The exhaust gas immediately exits the combustor 118 through the exhaust line 136 and is passed through the turbine section 138 of the gas turbine 106 where the exhaust gas cools and expands thereby generating mechanical power. The expanded and partially-cooled exhaust gas exits the turbine section 138 through an exhaust gas line 140. Sensible heat remaining in the exhaust gas exiting the turbine section 138 is used in various heat exchangers of the heat recovery system 214. As noted above, such heat exchangers include the air preheaters 216 and 218 which are used to pre-heat compressed combustion air, the raw fuel reformer 128 which is used to reform the raw fuel feed, the optional fuel heater 132 which may be used to heat the reformed fuel, and various water/steam heaters 232, 240, and 246.

Generally, when a raw dimethyl ether fuel/steam mixture is reformed to form a reformed fuel that is burned in the presence of air to produce a hot exhaust gas which passes through a turbine section of the gas turbine, the exhaust gas exiting the turbine section has a temperature of about 1000° F. (about 540° C.) to about 1200° F. (about 650° C.), preferably about 1050° F. (about 565° C.) to about 1150° F. (about 621 ° C.), and more preferably about 1090° F. (about 588° C.) to about 1120° F. (about 604° C.). Thus, based on the temperature of the exhaust gas entering and exiting the turbine section of the gas turbine, expensive and complex high-temperature turbines are not necessary; conventional turbines may be used and are preferred according to the invention.

The exhaust gas exiting the heat recovery system in the gas of a dimethyl ether fuel preferably has a temperature of about 190 ° F. (about 88° C.) to about 250° F. (about 121° C.), more preferably about 195° F. (about 90° C.) to about 215° F. (about 102° C.). Based on the exhaust gas temperature exiting the heat recovery system, it can be seen that the inventive process efficiently uses sensible heat present in the combustion exhaust gas. Furthermore, it can be seen that the bottoming Rankine cycle, operating under specified conditions, is capable of using the sensible heat in the exhaust gas to generate additional power in the low-pressure steam turbine. It should be noted, however, that the amount of power generated in the bottoming Rankine cycle based on the overall power generation of the entire power plant is significantly less than 40%, preferably less than about 30%, and more preferably less than about 10%. Hence, more than 60%, and more preferably more than 90% of the overall power generated by the power plant is generated by the gas turbines.

Within the fuel reformer, the fuel/steam mixture is reacted in the presence of a catalyst such that an endothermic reaction occurs converting the fuel/steam mixture into a reformed fuel mixture comprising hydrogen, carbon monoxide, and trace amounts of carbon dioxide. The endothermic heat necessary to carry out the invention is provided by the exhaust gas exiting the gas turbine. The extent of reformation of raw fuel and steam is a function of the reformer operating temperature and pressure and the molar ratio of steam to fuel. Preferably the molar ratio of steam to raw fuel is about 1:10 to about 1:1, more preferably about 0.7:4 to about 0.9:2.5 (i.e., about 0.175:1 to about 0.36:1).

In the case of a raw dimethyl ether fuel (see Example 1, below), where the molar ratio of steam to fuel is about 1.0, the steam/fuel mixture can be fed to the reformer at a temperature of about 300° F. (about 149° C.) to about 580° F. (about 304° C.), preferably about 350° F. (about 177° C.) to about 550° F. (about 288° C.), and more preferably at a temperature of about 380° F. (about 193 ° C.) to about 450° F. (about 232° C.). Accordingly, it has been determined that given these reformer inlet conditions, the exhaust gas entering the fuel reformer as a heat transfer fluid preferably has a temperature of about 770° F. (about 410° C.) to about 900° F. (about 482° C.), more preferably about 780° F. (about 415° C.) to about 850° F. (about 454° C.), and most preferably about 790° F. (about 421° C.) to about 825° F. (about 441 ° C.). Furthermore, it has been determined that the exhaust gas exits the reformer having a temperature of about 600° F. (about 315° C.) to about 750° F. (about 400° C.), preferably about 610° F. (about 321 ° C.) to about 700° F. (about 370° C.), and more preferably about 615° F. (about 323° C.) about 650° F. (about 343° C.). At the most preferred operating conditions of the fuel reformer, the conversion of the raw fuel/steam mixture to a reformed fuel is about 100%.

In the case of a raw dimethyl ether fuel (see Example 3, below), where the molar ratio of steam to fuel is about 2.28, the steam/fuel mixture can be fed to the reformer at a temperature of about 600 ° F. (about 315° C.) to about 670° F. (about 354° C.) and preferably at a temperature of about 650° F. (about 343° C.) to about 670° F. (about 354° C.). Accordingly, it has been determined that given these reformer inlet conditions, the exhaust gas entering the fuel reformer as a heat transfer fluid preferably has a temperature of about 700° F. (about 370° C.) to about 1090° F. (about 588° C.), more preferably about 800° F. (about 427° C.) to about 1090° F. (about 588° C.), and most preferably about 1060° F. (about 571° C.) to about 1085° F. (about 585° C.). Furthermore, it has been determined that the exhaust gas exits the reformer having a temperature of about 620° F. (about 327° C.) to about 740° F. (about 393 ° C.), preferably about 685° F. (about 363° C.) to about 740° F. (about 393° C.), and more preferably about 690° F. (about 366° C.) about 715° F. (about 380° C.). At the most preferred operating conditions of the fuel reformer, the conversion of the raw fuel/steam mixture to a reformed fuel is about 100%.

The invention provides a more efficient combination of thermochemical recuperation and exhaust gas cooling useful in many types of combined-cycle power plants. Such a combination allows the design of plants having net power generation efficiencies substantially higher than those of conventional designs by increasing the extent of power generation in more efficient gas turbines relative to that obtained in conventional combined-cycle power plants.

EXAMPLES

The following examples are provided to further illustrate the invention but are not intended to limit the scope thereof.

Example 1 is directed to an embodiment of the inventive power generation process and apparatus described above and shown in FIG. 1 using a raw, liquid dimethyl ether as the subject fuel. Example 2 is a comparative example illustrating a conventional combined-cycle power generation process using the same raw, liquid dimethyl ether as the subject fuel, and the same gas turbine operating conditions including a similar combustion air feed rate to the compressor of the gas turbine.

Example 3 is directed to another embodiment of the inventive power generation process and apparatus described above and shown in FIG. 2 using a raw, liquid dimetheyl ether as the subject fuel. Example 4 is a comparative example illustrating a conventional combined-cycle power plant using the same raw, liquid fuel as the subject fuel, with slightly modified gas turbine operating conditions.

Each of the processes used in Examples 1–4 were simulated using the ASPEN PLUS® process simulation software and assumed unit operation efficiencies (e.g., compressor efficiencies, extent of turbine-air cooling, etc.) where necessary. While such efficiencies for purposes of comparing Example 1 versus 2 and Example 3 versus 4 were different, the relative differences in the efficiencies assumed for Examples 1 and 3 (illustrating embodiments for the inventive power generation process), vis-à-vis the those assumed for Examples 2 and 4 (illustrating the conventional combined-cycle power plant), do not distort the basic performance enhancements achieved by the inventive process.

Example 1

An advanced thermochemical recuperation combined-cycle power plant as described above and shown in FIG. 1 was designed to generate power using a raw, liquid dimethyl ether flowrate of about 6,540 short tons/day (ST/D). A molar ratio of steam to raw fuel fed to the fuel reformer was about one, and reformer operating conditions were selected such that about a 100% reformation of the raw fuel was achieved. Relevant process data for this example are provided in Table 1 below. Note that the quantities shown in Table I for this example are based on the design illustrated in FIG. 1 employing four gas turbine trains (designated 106 in FIG. 1) in parallel, four heat recovery systems (designated 112 in FIG. 1), and one steam turbine train.

Atmospheric air was filtered and introduced into a compressor 104 of the gas turbine 106 via a line 108, while raw, liquid dimethyl ether fuel was pumped into the plant 200 at 60° F. (about 15.6° C.) and 77 pounds per square inch absolute (psia) (about 5.3 bars absolute) from the fuel source 120 and, thereafter, vaporized/pre-heated to a temperature of 390° F. (about 199° C.) in the heat exchanger 124. Vaporized dimethyl ether was then combined at the mixing point 126 with an equimolar amount of intermediate-pressure steam (about 58,099 lbs/hr/train), the steam having been generated in the heat recovery system 112. The resultant temperature of the steam/fuel mixture passed to the dimethyl ether reformer 128 in the line 130 was 402° F. (about 205° C.), which was higher than the expected reaction initiation temperature of the reforming catalyst (about 400° F. (about 204° C.)).

The reformed fuel exited the reformer 128 at 662° F. (about 350° C.) into the fuel gas heater 132 where the fuel was heated to a temperature of 771° F. (about 411° C.) by indirect heat exchange with turbine exhaust gas. Thereafter, the heated, reformed fuel was introduced via the fuel line 134 into the combustors 118 of each of the four gas turbine trains 106, which each produced about 240 megawatts (MW) of net power. Hot exhaust gas exited each of the gas turbine trains 106 at a temperature of 1101 ° F. (about 594° C.) and was passed into the heat recovery system 112. As noted above, and with reference to FIG. 1, the order of the exhaust gas flow through the heat recovery system 112 was as follows: air pre-heater 114, fuel gas heater 132, fuel reformer 128; and intermediate-pressure steam (335 psia (about 23 bars absolute)) and low-pressure steam (about 50 psia (about 3.4 bars absolute)) heaters 142 and 144, respectively. The power generated in the bottoming steam cycle was about 87 MW on a total plant basis (corresponding to one steam turbine train).

This example demonstrates the high power output generated in the gas turbines and the relatively low power output generated by the condensing, low-pressure steam turbine. This result is especially desirable because of the higher power generation efficiency of gas turbines relative to steam turbines, plus the relative ease in controlling the power generation in both the gas turbine trains and the low-pressure steam turbine train.

Of the total power produced by the power plant at the specified fuel flowrate (6,568 ST/D of raw fuel), less than about 8.5% of the total power was generated by the condensing, low-pressure steam turbines. Such low power production in the steam turbine is in direct contrast to the conventional combined-cycle power plant process described in Example 2 (Comparative Example) below. There, the steam turbines account for about 36% of the total power output. Similarly, the net power generation efficiency for the inventive TCR cycle is higher than that of the conventional combined-cycle power plant (56.36% vs. 55.90%, LHV basis). See Table I, below.

Example 2 (Comparative Example)

This example is provided for comparative purposes and is directed to a conventional combined-cycle power plant operating on a raw, liquid dimethyl ether fuel flowrate of about 6,840 ST/D. The simulated power plant employed a simple cycle that included three parallel gas turbine trains, and a bottoming Rankine cycle that included steam turbine that included high-pressure, intermediate-pressure, and low-pressure steam turbines each supplied with pressurized steam from three heat recovery steam generators (referred to hereinafter as the "HRSG"). Relevant process data for this example are provided in Table I below.

Atmospheric air was filtered and introduced into a compressor of a gas turbine, while raw, liquid dimethyl ether fuel was pumped into the plant at 60° F. (about 15.6° C.) and 77 psia (about 5.3 bars absolute) then vaporized/pre-heated to a temperature of 330° F. (about 165.6° C.) using hot boiler feed water from a intermediate-pressure steam loop of the bottoming Rankine cycle. Vaporized dimethyl ether was introduced into an inlet of a dry low $NO_x$ pre-mixed combustor of each of three gas turbine trains. Each of the three gas turbine trains produced a power output of 236.2 MW. Exhaust gas exited each of the gas turbine trains at a temperature of 1102° F. (about 594° C.) and was used to produce the triple pressure steam required in the bottoming Rankine cycle.

The exhaust gas exiting each of the gas turbine trains was combined and fed to the HRSGs. The arrangement of the various heat exchangers comprising the HRSGs in the direction of exhaust gas flow was: (a) steam superheater and re-heater in parallel; (b) high-pressure evaporator; (c) intermediate-pressure superheater; (d) high-temperature boiler feed water economizer (HTBFWE); (e) intermediate-pressure evaporator; (f) low-pressure superheater; (g) low-temperature boiler feed water economizer in parallel (LTBFWE); (h) low-pressure evaporator/integral deaerator; and (9) condensate heater.

A high-pressure boiler feed water (555,436 lbs/hour/train) from the deaerator (h) was heated in the LTBFWE (g) from 320° F. (about 160° C.) to 438° F. (about 225° C.), and was further heated to 626° F. (about 330° C.) in the HTBFWE (d) before entering the high-pressure evaporator (b) where a high-pressure steam (552,659 lbs/hour/train) was produced having a pressure of 2069 psia (142.6 bars absolute). The high-pressure steam was superheated in a superheater (a) to a temperature of 1007° F. (about 542° C.).

The high-pressure steam was fed to a high-pressure section of the steam turbine. The high-pressure section of the steam turbine received the superheated, high-pressure steam at 1865 psia (about 128.6 bars absolute) and a temperature of 1000° F. (about 538° C.) from each of the three HRSGs and exhausted a lower pressure steam (referred to as intermediate-pressure steam) at 425 psia (about 29.3 bars absolute) and 635° F. (about 335° C.). The intermediate-pressure steam was passed to the re-heater (a) which increased the temperature of the intermediate-pressure steam to 1005 ° F. (about 541° C.).

Intermediate-pressure boiler feed water (about 341.891 lbs/hour/train) from the deaerator (d) was heated in the LTBFWE (g) from 320° F. (about 160° C.) to 438° F. (about 225 ° C.), and a portion of this water was passed to a fuel heater/vaporizer while the remaining portion of this water was fed to the intermediate-pressure evaporator (e) where a intermediate-pressure steam (about 144,800 lbs/hour/train) having a pressure of 436 psia (about 30.0 bars absolute) was produced and was superheated in a superheater (a) to 500° F. (about 260° C.). Intermediate-pressure, superheated steam from each of the three HRSGs was combined along with the flow of re-heated intermediate-pressure steam exhausted from the high-pressure section of the steam turbine (described in the previous paragraph). The intermediate-pressure section of the steam turbine received 380 psia (about 26.2 bars absolute) re-heated steam at 1000° F. (about 538° C.) from each of the three HRSGs and exhausted a lower pressure steam (referred to as a low-pressure steam).

A low-pressure steam produced at 90 psia (about 6.2 bars absolute) in the low-pressure evaporator (h) (about 40,358 lbs/hour/train) was superheated in the superheater (a) to 345° F. (about 174° C.) and was mixed with the low-pressure steam exhausted from the intermediate-pressure section of the steam turbine. This low-pressure steam mixture was introduced into the low-pressure section of the steam turbine at 68 psia (about 4.7 bars absolute). An exhaust from the low-pressure section of the steam turbine was passed to a water-cooled surface condenser operating at 1.5 inches mercury absolute (about 0.05 bars absolute) where the steam was condensed. This condensate was combined with make-up water (about 2,222,415 lbs/hour for the entire power plant) having a temperature of about 90° F. (about 32° C.), and the combined water flow was divided and fed to each of the three HRSGs. Within each of the HRSGs, the combined water flow was heated to 300° F. (about 149° C.) and fed to the deaerators (g) where the steam cycle was repeated.

The extremely complex design of the HRSG units was specific to the flowrate of the fuel feed and combustion air, as well as the expected temperature of the exhaust gas exiting the gas turbine. Based on the foregoing description and the data tabulated below, the comparative example demonstrates the high percentage (36%) of power generated by the three sections of the steam turbine (384 MW) based on the overall power produced by the combined cycle power plant (1068 MW). Furthermore, it demonstrates that complex re-configuration of process conditions would be necessary should the demand for power shift between peak and partial load. For example, if the flowrate of the fuel feed (or combustion air) were changed to accommodate a shift in power consumption demand, the turbine exhaust gas would have a different temperature which would require re-configuration of all of the operating conditions of the bottoming Rankine cycle detailed above (e.g., flowrates, temper atures, pressures, and he at duties).

TABLE I

| Data | Example 1 | Example 2 |
|---|---|---|
| Fuel Feed Rate (ST/D) | 6540 | 6840 |
| MMBtu/hr (HHV) | 6952 | 7272 |
| MMBtu/hr (LHV) | 6236 | 6525 |
| Air to each Gas Turbine (lb/sec) | 1377.43 | 1387.85 |
| Power | | |
| Power Gas Turbines (kW) | 959,864 | 708,861 |
| Power Steam Turbine(s) (kW) | 87,336 | 384,471 |
| Auxiliary Power Consumed (kW) | (17,264) | (24,606) |
| Net Power Output (kW) | 1,029,936 | 1,068,546 |
| Power Generation Efficiency | | |
| Net Heat Rate (HHV) (Btu/kW/hr) | 6749 | 6804 |
| % Fuel to Power | 50.57 | 50.16 |
| Net Heat Rate (LHV) (Btu/kW/hr) | 6056 | 6106 |
| % Fuel to Power | 56.36 | 55.90 |

Example 3

An advanced thermochemical recuperation combined-cycle pow e r plant as described above and shown in FIG. 2 was designed to generate power using a raw, liquid dimethyl ether flowrate of about 35.984 lbs/sec. A weight ratio of steam to raw fuel fed to the fuel reformer was about 0.89, which corresponds to a molar ratio of about 2.28. The reformer operating conditions were selected such that about a 100% reformation of the raw fuel was achieved. Relevant process data for this example are provided in Table II below.

Atmospheric air (about 442.4 lbs/sec) was filtered and introduced into the compressor 104 of the gas turbine 106 via the compressed air line 108. A spearate air stream (about 764.1 lbs/sec) was filtered and compressed in a three stage compressor as depicted in FIG. 2, and passed through air preheaters 216 and 218 before being fed to the combustor 118 of the gas turbine 106. An exhaust gas exited the gas turbine 106 at flowrate of 1274.5 lbs/sec and was eventually vented to the atmosphere at a temperature of about 212° F. (about 100° C.).

As detailed in Table II, the gas turbine generated about 454.0 MW of power in this embodiment of the advanced thermochemical recuperation combined-cycle power plant. The air compressor coupled to the gas turbine drew about 66.5 MW, resulting in a net power generation by the gas turbine of 387.5 MW. The power required for the external staged-compressors was about 102.5 MW (at 90% efficiency for each staged compressor). The low-pressure steam turbine generated about 1.7% of the total power generated by this power plant which is in stark contrast to the 33.4% of the total power generated by the bottoming Rankine cycle of conventional combined-cycle power plants (see Example 4 (Comparative Example)).

The overall power generation efficiency (LHV basis) of this embodiment of the advanced thermochemical recuperation combined-cycle power plant was about 61.97%.

Example 4 (Comparative Example)

This example is provided for comparative purposes and is directed to a conventional combined-cycle power plant operating on a raw, liquid dimethyl ether fuel flowrate of about 44.799. The simulated power plant employed a simple cycle that included one gas turbine train, and a bottoming Rankine cycle that included steam turbine that included high-pressure, intermediate-pressure, and low-pressure steam turbine sections each supplied with pressurized steam from a heat recovery steam generator. Relevant process data for this example are provided in Table II below.

TABLE II

| Data | Example 3 | Example 4 |
| --- | --- | --- |
| Gas Turbine Data | | |
| Fuel Feed Rate (lb/sec) | 35.984 | 44.799 |
| Inlet Temp. (° F.) | 2400 | 2400 |
| Inlet Pressure (psia) | 220 | 220 |
| Outlet Temp. (° F.) | 1106 | 1100 |
| Air flow to compressor (lb/sec) | 442.4 | 1168.0 |
| Air flow to gas turbine cooling (lb/sec) | 119.3 | 120.3 |
| Exhaust Gas Flowrate (lb/sec) | 1274.4 | 1212.8 |
| Air flow to Staged-Compressors (lb/sec) | 764.1 | — |
| Power | | |
| Power Gas Turbines (MW) | 454.0 | 424.1 |
| Power Steam Turbine(s) (MW) | 5 | 111.3 |
| Power Consumed by Compressors (MW) | 169 | 196.2 |
| Auxiliary Power Consumed (MW) | 3.2 | 6.2 |
| Net Power Output (kW) | 286.8 | 333.0 |
| % Fuel to Power | 61.97* | 57.8 |

*= In Example 3, a 90% efficiency was assumed for the staged compressors. If a compressor efficiency of 85% were assumed, then the power generation efficiency would be 60.5%.

The foregoing description is given for clearness of understanding only, and no unnecessary limitations should be understood therefrom, as modifications within the scope of the invention may be apparent to those skilled in the art.

What is claimed is:

1. A method of generating power, the method comprising the steps of:
   (a) burning a reformed fuel in the presence of compressed air in a combustor to produce an exhaust gas having an elevated temperature with respect to ambient temperature;
   (b) passing a portion of the exhaust gas produced in step (a) through a gas turbine to generate power;
   (c) reforming a mixture of steam and a raw, natural gas-derived, oxygenated fuel capable of being reformed at a temperature of about 300° F. to about 932° F., by passing the mixture through a catalytic reactor in indirect heat exchange relationship with the exhaust gas from an outlet of the gas turbine of step (b) to provide an amount of heat from said exhaust gas sufficient to reform the mixture to produce the reformed fuel burned in step (a); and, (d) passing at least a portion of the exhaust gas from the catalytic reactor through a heat exchanger of a Rankine cycle to generate power in the Rankine cycle,
   wherein the amount of power generated in the Rankine cycle, based on the overall power generated is less than about 30%.

2. The method of claim 1, wherein the Rankine cycle is a low-pressure Rankine cycle.

3. The method of claim 1, wherein the reactor is a thermochemical recuperator containing a steam-reforming catalyst.

4. The method of claim 1, wherein the raw, natural gas-derived, oxygenated fuel is capable of being reformed at a temperature of about 300° F. to about 670° F.

5. The method of claim 1, wherein the reformed fuel is a reaction product of a catalytic reaction between steam and the raw fuel.

6. The method of claim 5, wherein the raw, natural gas-derived, oxygenated fuel is selected from the group consisting of methanol, ethanol, dimethyl ether, dimethyl carbonate, methyl formate, and mixtures thereof.

7. The method of claim 6, wherein the raw, natural gas-derived, oxygenated fuel is dimethyl ether.

8. The method of claim 5, wherein the mixture has a molar ratio of steam to raw fuel of about 1:10 to about 1:1.

9. The method of claim 8, wherein the molar ratio is about 0.175:1 to about 0.36:1.

10. The method of claim 8, wherein the mixture enters the reactor at a temperature of about 300° F. to about 670° F.

11. The method of claim 10, wherein the mixture enters the reactor at a temperature of about 350 ° F. to about 550° F.

12. The method of claim 10, wherein the mixture enters the reactor at a temperature of about 650° F. to about 670° F.

13. The method of claim 8, wherein the exhaust gas enters the reactor at a temperature of about 700° F. to about 1090° F.

14. The method of claim 8, wherein the exhaust gas enters the reactor at a temperature of about 790° F. to about 825° F.

15. The method of claim 13, wherein the exhaust gas enters the reactor at a temperature of about 1060° F. to about 1085° F.

16. The method of claim 8, wherein the exhaust gas exits the gas turbine at a temperature of about 1000° F. to about 1200° F.

17. The method of claim 16, wherein the exhaust gas exits the gas turbine at a temperature of about 1090° F. to about 1120° F.

18. The method of claim 1, wherein the compressed air in step (a) is a combined flow of a first compressed air stream and a second compressed air stream, the second compressed air stream having a temperature of about 10° F. to about 400° F. lower than that of the temperature of the exhaust gas exiting the gas turbine.

19. The method of claim 18, further comprising prior to step (c), the step of passing the exhaust gas from the outlet of the gas turbine through a heat exchanger to increase the temperature of the second compressed air stream.

20. The method of claim 19, further comprising in step (c), the step of passing a portion of the exhaust gas from the outlet of the gas turbine through the heat exchanger to increase the temperature of the second compressed air stream.

21. A method of generating power, the method comprising the steps of:

(a) burning a reformed fuel in the presence of compressed air in a combustor to produce an exhaust gas having a temperature in a range of about 700° F. to about 1090° F.;

(b) passing a portion of the exhaust gas produced in step (a) through a gas turbine to generate power;

(c) reforming a mixture of steam and a raw fuel selected from the group consisting of methanol, ethanol, dimethyl ether, dimethyl carbonate, methyl formate, and mixtures thereof, by passing the mixture through a catalytic reactor in indirect heat exchange relationship with the exhaust gas from an outlet of the gas turbine of step (b) to provide an amount of heat from said exhaust gas sufficient to reform the mixture to produce the reformed fuel burned in step (a); and, (d) passing a portion of the exhaust gas from the catalytic reactor through a heat exchanger of a Rankine cycle to generate power in the Rankine cycle.

22. The method of claim 1, wherein the of power generated in the Rankine cycle, based on the overall amount of power generated, is less than about 10%.

* * * * *